United States Patent
Bull et al.

(10) Patent No.: US 8,327,118 B2
(45) Date of Patent: Dec. 4, 2012

(54) SCHEDULING CONTROL WITHIN A DATA PROCESSING SYSTEM

(75) Inventors: David Michael Bull, Balsham (GB); Emre Ozer, Cambridge (GB); Shidhartha Das, Cambridge (GB)

(73) Assignee: ARM Limited, Cambridge (GB)

(*) Notice: Subject to any disclaimer, the term of this patent is extended or adjusted under 35 U.S.C. 154(b) by 320 days.

(21) Appl. No.: 12/458,699

(22) Filed: Jul. 21, 2009

(65) Prior Publication Data

US 2010/0064287 A1    Mar. 11, 2010

(30) Foreign Application Priority Data

Sep. 5, 2008 (GB) .................................. 0816296.8

(51) Int. Cl.
   *G06F 9/30* (2006.01)
   *G06F 9/40* (2006.01)
   *G06F 15/00* (2006.01)

(52) U.S. Cl. ........................................................ 712/214

(58) Field of Classification Search .................. 712/23, 712/215, 219
   See application file for complete search history.

(56) References Cited

U.S. PATENT DOCUMENTS

| 5,689,720 A * | 11/1997 | Nguyen et al. .................. 712/23 |
| 6,161,173 A | 12/2000 | Krishna et al. |
| 6,195,744 B1 | 2/2001 | Favor et al. |
| 2006/0288196 A1 * | 12/2006 | Unsal et al. ................... 712/235 |

FOREIGN PATENT DOCUMENTS

WO   WO 2004/084072   9/2004

OTHER PUBLICATIONS

Vera, Xavier et al, "X-Pipe: An Adaptive Resilient Microarchitecture for Parameter Variations", 10 pages.
Anderson, D.W. et al., "The IBM System/360 Model 91: Machine Philosophy and Instruction-Handling", IBM Journal, (Jan. 1967), pp. 8-24.
Tomasulo, R.M., "An Efficient Algorithm for Exploiting Multiple Arithmetic Units", IBM Journal, (Jan. 1967), pp. 25-33.
UK Search Report dated Dec. 4, 2008 for GB 0816296.8.

* cited by examiner

*Primary Examiner* — Corey S Faherty
(74) *Attorney, Agent, or Firm* — Nixon & Vanderhye P.C.

(57) ABSTRACT

A processor 2 is responsive to a stream of program instructions to issue program instructions under control of scheduling circuitry 6 to respective execution units 24 for execution. The execution units 24 can include error detecting circuitry 32 for detecting a change in an output signal which occurs after the output signal has latched and during an error detecting period following the latching of the output signal. The scheduling circuitry 6 is arranged so as to suppress issue of program instructions to an execution unit 24 having such error detecting circuitry 32 on consecutive processing cycles.

17 Claims, 5 Drawing Sheets ns. As an example, a superscalar
SCHEDULING CONTROL WITHIN A DATA PROCESSING SYSTEM This application claims priority to UK Application No. 0816296.8, filed 5 Sep. 2008, the entire contents of which is hereby incorporated by reference.

BACKGROUND OF THE INVENTION

1. Field of the Invention

This invention relates to the field of data processing systems. More particularly, this invention relates to the control of program instruction scheduling within data processing systems.

2. Description of the Prior Art

It is known to provide data processing systems, such as superscalar processors and out-of-order processors, which include scheduling circuitry for controlling the issue of program instructions within a stream of program instructions to the execution units which are to perform the corresponding data processing operations. As an example, a superscalar processor may have multiple adder circuits which are capable of performing respective different add operations in parallel and to which different add instructions within a stream of program instructions may be issued in parallel. Out-of-order systems seek to improve the efficiency of use of the processing resources within a processor by modifying the order in which instructions are issued to the execution units away from the order of the stream of program instructions.

It is known from International Published Patent Application No. WO-A-2004/084072 to provide data processing circuits, including processing pipelines, that include error detecting circuitry associated with latches within the pipeline so as to identify errors in a captured signal value. The error detecting circuitry can operate by detecting any change in a signal value following a sampling point at which the signal was captured into a latch. Such a late change in the signal value indicates that the signal value may not have reached its proper value at the point at which it was sampled and accordingly an error has arisen. When such an error is detected, an error recovery response may be initiated, such as flushing the pipeline, adjusting an operational parameter and re-executing the flushed program instructions.

A problem which can arise with such error detecting mechanisms is where a change in a signal value is detected as a result of a signal path through the execution unit which is too quick and results in a change in the signal value consequent on the correct processing of the following cycle thereby resulting in a false positive error detection. Such errors can be termed "short path" errors.

One way of dealing with such short path errors is to identify all possible signal paths through the execution unit which may be traversed during the error detecting period following the sampling/capture time and adding to these paths buffer circuits to slow such propagation such that no change will occur in the signal detected by the error detecting circuitry until after the error detecting period has expired. Whilst such an approach may be effective in suppressing short path errors, it suffers from the disadvantage of requiring the use of additional gates to provide the buffering and also additional analysis seeking to identify short paths which require buffering.

SUMMARY OF THE INVENTION

Viewed from one aspect the present invention provides apparatus for processing data in response to a stream of program instructions, said apparatus comprising:

a plurality of execution units responsive to said stream of program instructions to perform data processing operations specified by said stream of program instructions; and dynamic scheduling circuitry responsive to a current state of said plurality of execution units to issue for execution during one or more processing clock cycles program instructions of said stream of program instructions to respective execution units of said plurality of execution units; wherein at least one of said execution units is an error-detecting execution unit comprising a latch responsive to a signal generated by said error-detecting execution unit to capture at a capture time a data value and error detecting circuitry responsive to a change in said signal during an error detecting period following said capture time to trigger an error recovery response; and said scheduling circuitry suppresses issue of program instructions to said error-detecting execution unit on consecutive processing clock cycles.

The present technique recognises that in the context of a processing system having a scheduling mechanism, the scheduling mechanism may be used to suppress issue of program instructions to an execution unit employing the above error detection techniques on consecutive processing cycles such that processing correctly resulting from a following program instruction will not be incorrectly detected as a short path error associated with the processing of an immediately preceding program instruction. While this approach may seem disadvantageous, since it defers issue of program instructions which would otherwise be executed earlier, it recognises that often there is the possibility to issue that program instruction to other execution unit providing the same functionality as many real life processing systems have duplicate resources. Thus, short path errors may be avoided without incurring the overhead of buffering circuitry by issuing program instructions to the available resources in a manner in which an execution unit which is susceptible to a short path error will not receive program instructions on consecutive processing cycles.

The dynamic scheduling circuitry can take a variety of different forms and provide dynamic scheduling in accordance with parameters other than the above described avoidance of consecutive program instruction issued to a short-path-vulnerable execution unit, such as providing variation in the order of issue of program instructions, the number of program instructions issued in a processing cycle and the time of issuing a program instruction.

Whilst the present techniques may be used in non-superscalar processors, the technique can be used with particular advantage within superscalar processors, particularly out-of-order superscalar processors, which already have mechanisms for deferring program instruction issue.

The plurality of execution units may be formed into groups sharing a common operand input path and/or a common operand output path with the scheduling circuitry permitting issue of program instructions of consecutive processing clock cycles to different execution units within the group.

A group may comprise a plurality of execution units having common functionality with the scheduling circuitry issuing consecutive program instructions requiring the common functionality to different execution units within the group. As an example, a group may be provided with two adder circuits with those adder circuits being used on alternate processing cycles to avoid a short path error arising in either of the adder circuits.

The execution units can be arranged to form a plurality of execution clusters for respective different types of program instructions with the scheduling circuitry operating to maintain an instruction queue in respect of each of these execution clusters. The different execution clusters are formed in this way as the scheduling rules can then be more conveniently arranged to differ between clusters and be common within a cluster.

In some examples, the execution clusters comprise one or more of a simple execution cluster, a branch execution cluster, a complex execution cluster and a load/store execution cluster.

Each of these execution clusters may comprise one or more execution pipelines which can vary in depth and number.

Viewed from another aspect the present invention provides an apparatus for processing data in response to a stream of program instructions, said apparatus comprising:

a plurality of execution means for performing data processing operations specified by said stream of program instructions; and dynamic scheduling means responsive to a current state of said plurality of execution means for issuing for execution during one or more processing clock cycles program instructions of said stream of program instructions to respective execution means of said plurality of execution means; wherein at least one of said execution means is an error-detecting execution means comprising latch means for capturing at a capture time a data value from a signal generated by said error-detecting execution unit and error detecting means for triggering an error recovery response upon detection of a change in said signal during an error detecting period following said capture time; and said scheduling means suppresses issue of program instructions to said error-detecting execution means on consecutive processing clock cycles.

Viewed from a further aspect the present invention provides a method of processing data in response to a stream of program instructions, said method comprising the steps of:

in response to said stream of program instructions, performing data processing operations specified by said stream of program instructions using a plurality of execution units, at least one of said execution units being an error-detecting execution unit using a latch responsive to a signal generated by said error-detecting execution unit to capture at a capture time a data value and error detecting circuitry responsive to a change in said signal during an error detecting period following said capture time to trigger an error recovery response;

as part of dynamic scheduling responsive to a current state of said pluraltiy of execution units issuing for execution during one or more processing clock cycles program instructions of said stream of program instructions to respective execution units of said plurality of execution units; and suppressing issue of program instructions to said error-detecting execution unit on consecutive processing clock cycles.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
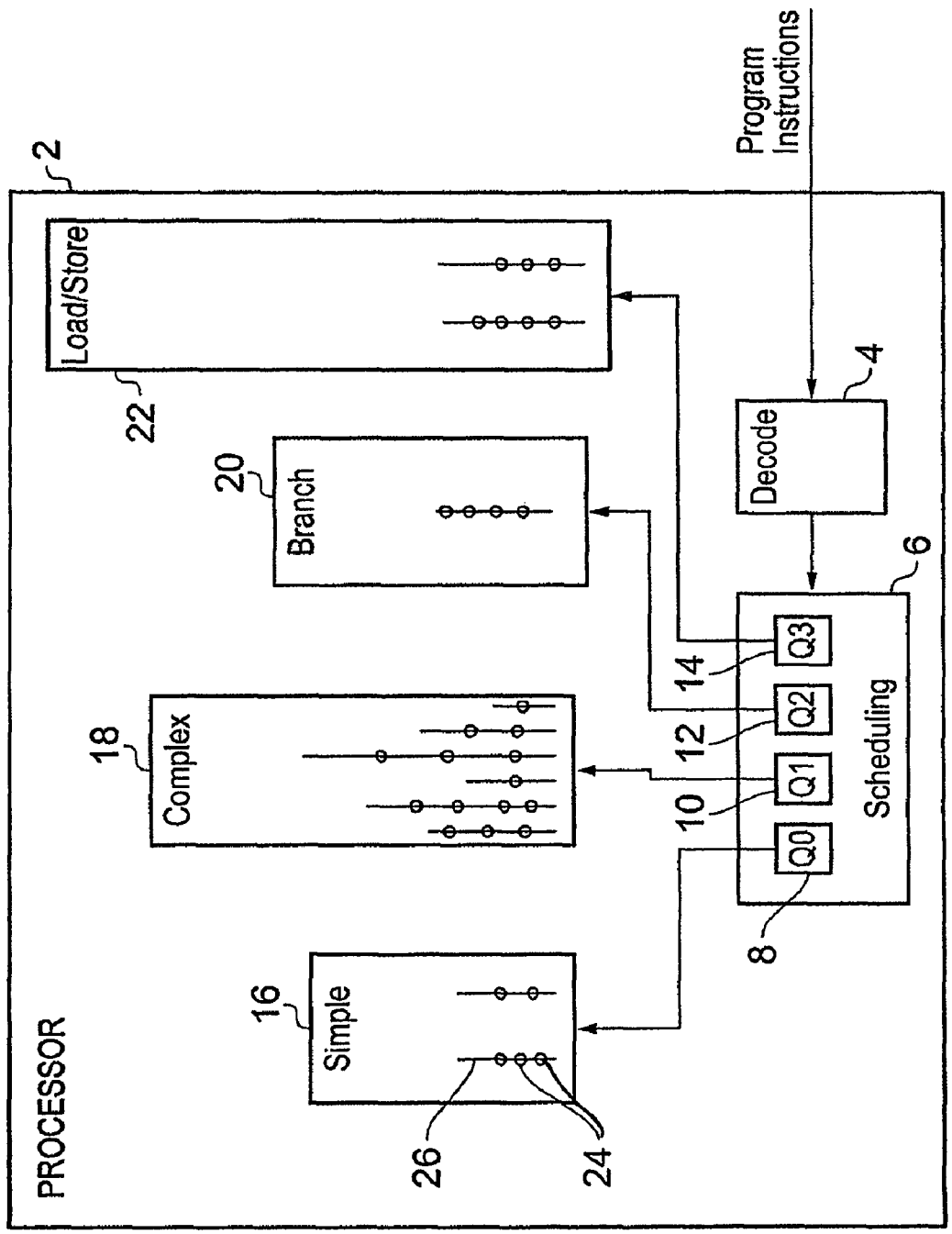
FIG. 1 schematically illustrates a processor including scheduling circuitry and multiple clusters of execution pipelines with each execution pipeline including multiple execution units.

FIG. 1 schematically illustrates an out-of-order superscalar processor 2 for performing data processing operations in response to a stream of program instructions. The program instructions are received by a decoder 4 and passed to scheduling circuitry 6 where they are added to an appropriate instruction queue 8, 10, 12, 14. The decoder 4 identifies the type of program instruction received and accordingly allocates the program instruction to the appropriate one of the instruction queues 8, 10, 12, 14. The separate instruction queues 8, 10, 12, 14 supply program instructions to a respective execution cluster 16, 18, 20, 22 under control of the scheduling circuitry 6. The execution clusters comprise a simple execution cluster 16 for executing arithmetic logic operations (such as adds, shifts etc), a complex execution cluster 18 for executing instructions (such as multiply accumulate instructions, floating point instructions and other complex instruction types), a branch execution cluster 20 for executing branch instructions and a load/store execution cluster 22 for executing load/store instructions.

The scheduling circuitry 6 can operate a different scheduling policy in respect of each of the execution clusters 16, 18, 20, 22. For example, the simple execution cluster 16 may be able to deal at each cycle with two instructions and these can be out-of-order providing data dependencies permit. The complex execution cluster 18 may be only capable of receiving one instruction in an in-order manner with each cycle. The branch execution cluster 20 may similarly only be capable of dealing with one in-order instruction with each cycle. The load/store execution cluster may be capable of dealing with one load instruction and one store instruction, which may be out-of-order, in any processing cycle. It will be appreciated from this that the scheduling circuitry will be responsive to the current state of the execution units within the execution clusters 16, 18, 20, 22 to perform scheduling that can vary one or more of an order of issue of the program instructions, a number of program instructions issued in a processing cycle and a time of issuing of program instruction. The processor 2 is a superscalar processor supporting out-of-order execution where appropriate and having duplication in the execution units provided so as to support the parallel execution of multiple instructions at any given time. This type of processor is well suited to the use of the present techniques.

Illustrated within FIG. 1 are multiple execution units 24 disposed within each of the pipelines 26 that are themselves disposed within respective execution clusters 16, 18, 20, 22 (this is shown logically and in practice the circuits with a cluster may be mixed with those of another cluster). The number of execution units 24 within any given pipeline 26 will vary depending upon the processing task to be performed. Some pipelines may contain only a single execution unit, which evaluates in a single processing cycle, whereas other instruction pipelines may be comparatively deep and contain a comparatively large number of execution units requiring multiple processing cycles to complete the processing of a program instruction.

Figure 2:
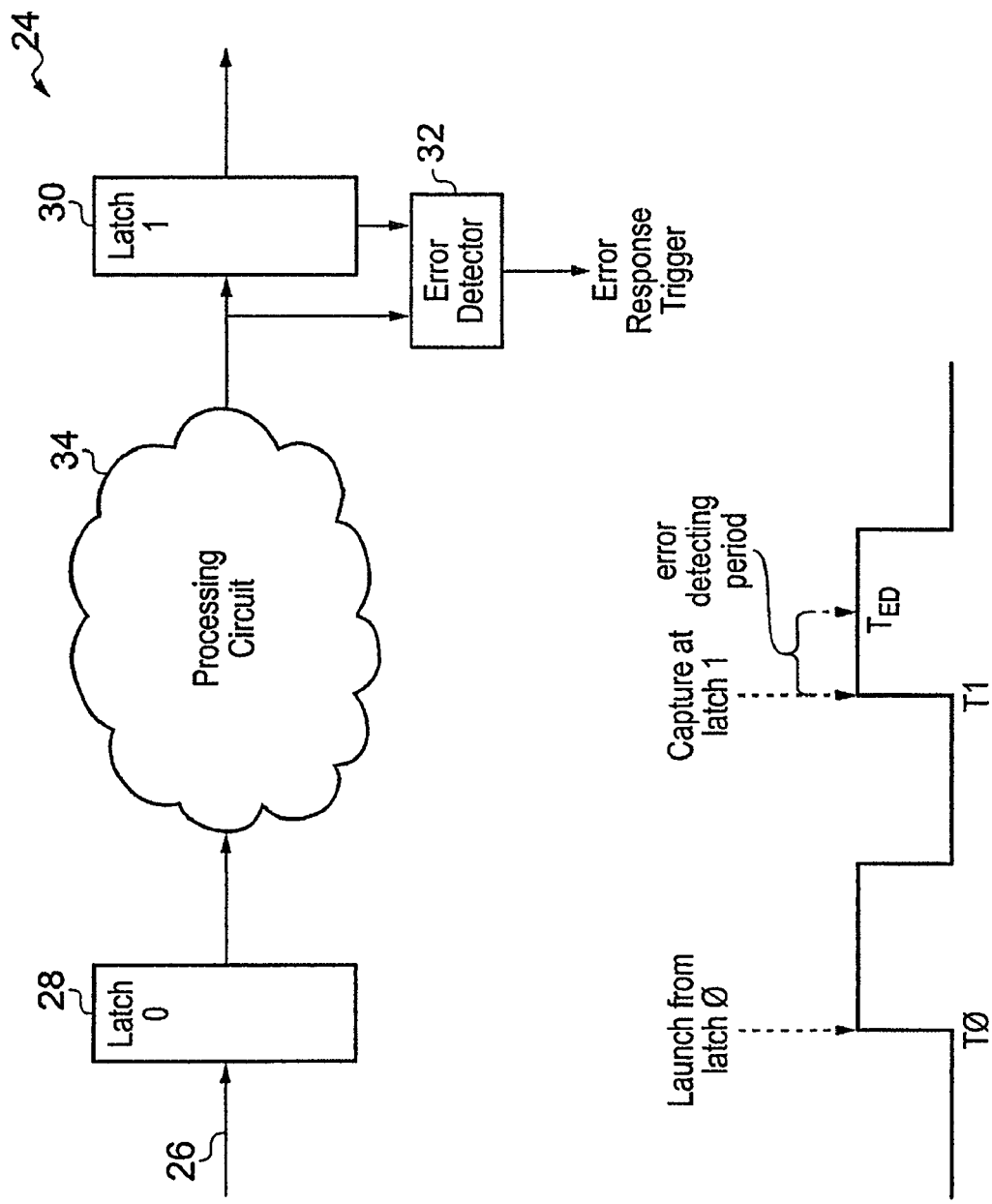
FIG. 2 schematically illustrates an execution unit being an error-detecting execution unit including error detecting circuitry.

FIG. 2 schematically illustrates an execution unit 24 within a pipeline 26 that is formed as an error-detecting execution unit. Such an error-detecting execution unit can employ techniques the same as or similar to those described in International Published Patent Application WO-A-2004/084072. The execution unit includes an input latch 28, an output latch 30 and error detector circuitry 32. The input latch 28 launches input signal values into processing circuitry 34 at time T0. These signal values propagate through the processing circuitry 34 and generate one or more output signal values which are captured by the output latch 30 at time T1. The error detector circuitry 32 then monitors the output signal values from the processing circuitry 34 for an error detecting period up to time $T_{ED}$ and if any change occurs in the output signals being monitored, then this triggers an error response. The error response can take a wide variety of different forms, such as flushing the relevant execution pipeline, changing operational parameter, ignoring the detected error (if circumstances such as a low frequency in use suggest it is likely a short path error) upon the assumption that it is a spurious error resulting from a short path error (at least at its first occurrence) or some other response. It will be understood from FIG. 2 that if at time T1 a new set of input values are launched from the input latch 28 into the processing circuitry 32, then there is the potential for a short path through the processing circuitry 34 that will result in a change arising in one or more of the output signals received at the output latch 30 prior to the end of the error detecting period, i.e. prior to time $T_{ED}$. This will be a false positive short path error as the values held within the output latch 30 will be correct. It is this type of short path error which is normally addressed by adding buffer circuitry into identified potential short paths.

As discussed above, the scheduling circuitry 6 provided within the processor 2 applies scheduling policies of varying complexity and matched to the instruction queue 8, 10, 12, 14 and associated execution cluster 16, 18, 20, 22. As well as scheduling policies such as varying the order, number and time of issue as previously discussed, the scheduling circuitry 6 can serve to suppress issue on consecutive processing cycles an execution unit having an error detecting mechanism (such as is shown on FIG. 2) so as to avoid potential short path errors within that error detecting execution unit.

Figure 3:
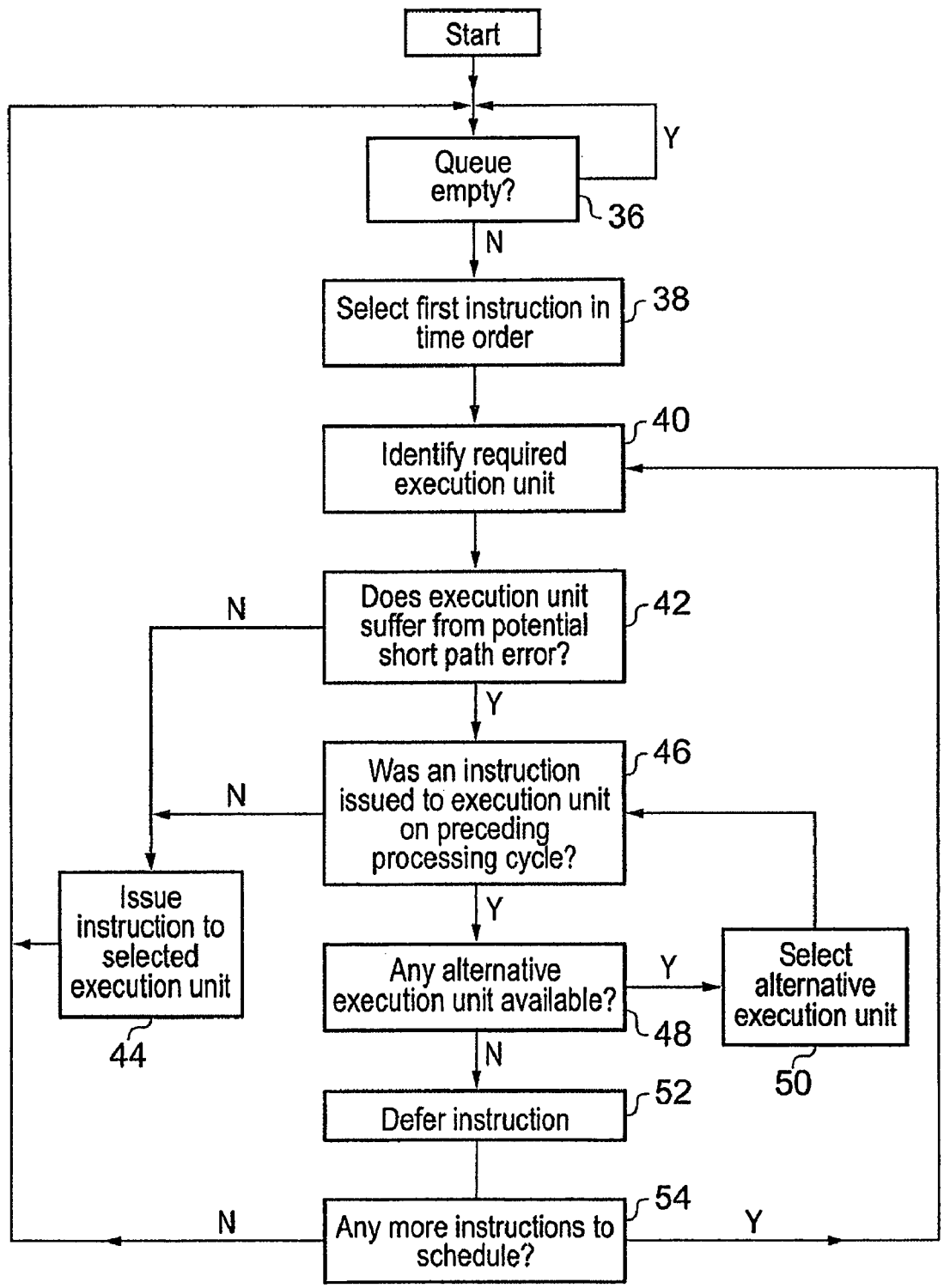
FIG. 3 is a flow diagram schematically illustrating part of the scheduling processing performed by the scheduling circuitry so as to avoid issue of program instructions on consecutive clock cycles to an execution unit susceptible to short path error.

FIG. 3 is a flow diagram illustrating how the processing provided by the scheduling circuitry 6 may logically operate. It will be appreciated that the processing illustrated in FIG. 3 can be realised in hardware in a variety of different ways. Furthermore, the flow diagram of FIG. 3 could be rearranged and/or altered whilst still providing the appropriate issue suppression to avoid short path errors as previously discussed.

Step 36 waits until there is an instruction within the associated queue 8, 10, 12, 14 which requires issue. Step 38 then selects the first instruction in time order within the instruction queue. Step 40 identifies which execution unit will be required to execute the selected instruction. Step 42 determines whether the execution unit identified and selected is one which potentially suffers from a short path error, i.e. is at least one which has been provided with the error detecting circuitry 32. If the execution unit is not one which potentially suffers from short path errors, then processing proceeds to step 44 where the instruction is issued to the selected execution unit prior to processing returning to step 36. If the execution unit selected is one which does potentially suffer from short path errors, then processing proceeds to step 46 where a determination is made as to whether or not an instruction was issued that that execution unit on the preceding processing cycle (i.e. so as to identify whether issuing the current program instruction on the current processing cycle will result in the issue of program instructions to the same the execution unit on consecutive processing cycles). If the determination at step 46 is that an instruction was not issued to the selected execution unit on the preceding processing cycle, then again processing proceeds to step 44 where the instruction is issued.

If the determination at step 46 was that an instruction was issued to the selected execution unit on the preceding processing cycle, then processing proceeds to step 48 where a determination is made as to whether or not there are any alternative execution units available within the relevant execution cluster 16, 18, 20, 22 which provide the same functionality and to which the program instruction concerned could be issued. If there are such alternative execution units available, then one of these is selected at step 50 and processing is returned to step 46. If there are no such alternative execution units available, then processing proceeds to step 52 where the program instruction selected at step 38 is deferred. This does not mean that the program instruction is discarded, merely that it is not scheduled at this time. If the scheduling policy for the execution cluster 16, 18, 20, 22 concerned is one which supports out-of-order execution, then processing may proceed to step 54 where a determination is made as to whether or not there are any more instructions to schedule, if there are more such instructions to schedule, then processing returns to step 40 where the execution unit required for the next instruction can be identified after that instruction has been selected for execution in step 54. If there are no more instructions to schedule, or if the execution cluster 16, 18, 20, 22 does not support out-of-order execution, processing returns to step 36.

Figure 4:
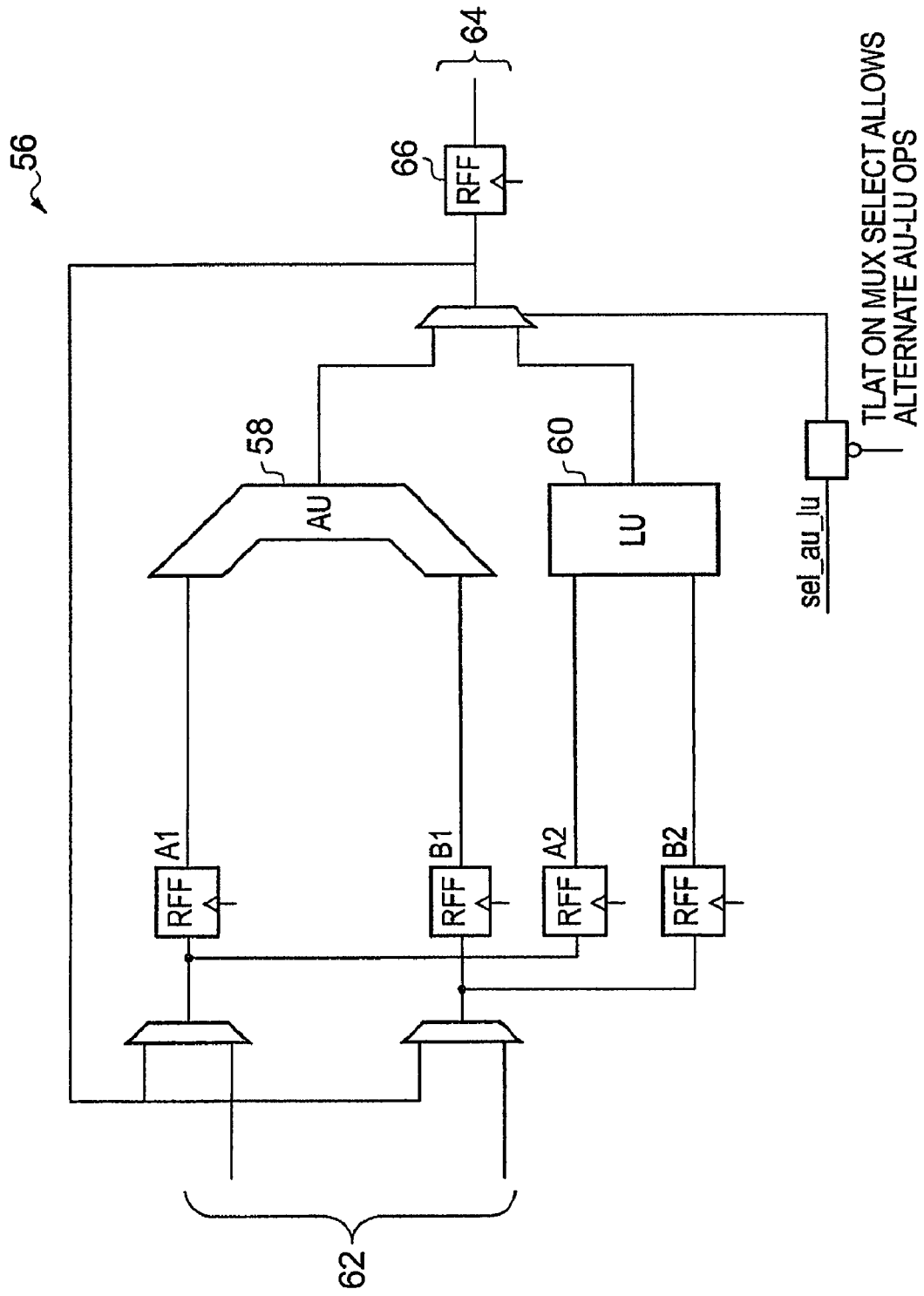
FIG. 4 schematically illustrates a group of execution units forming an arithmetic logic unit.

FIG. 4 schematically illustrates a group of execution units 56 comprising an execution unit in the form of an arithmetic unit 58 and an execution unit in the form of a logic unit 60. These execution units are coupled to a common input operand path 62 and a common output operand path 64 (although it is possible for only one of these to be shared). The latches at the input operand path 62 and the output operand path 64 are provided with error detecting circuitry 32. As the group of execution units 56 shares an output latch 66, a short path through either the arithmetic unit 58, or the logic unit 60, could result in a short path error. Accordingly, program instructions are not scheduled on consecutive processing cycles to the arithmetic logic 48 or separately to the logic unit 60. The scheduling circuitry 6 imposes this scheduling policy in accordance with processing control similar to that illustrated in FIG. 3, except that step 46 would encompass a test for the issue of an instruction to an execution unit within the same group of execution units 56 sharing a common output latch 60. Given that this configuration is static, the scheduling circuitry 6 can be formed so as to enforce such a policy.

Figure 5:
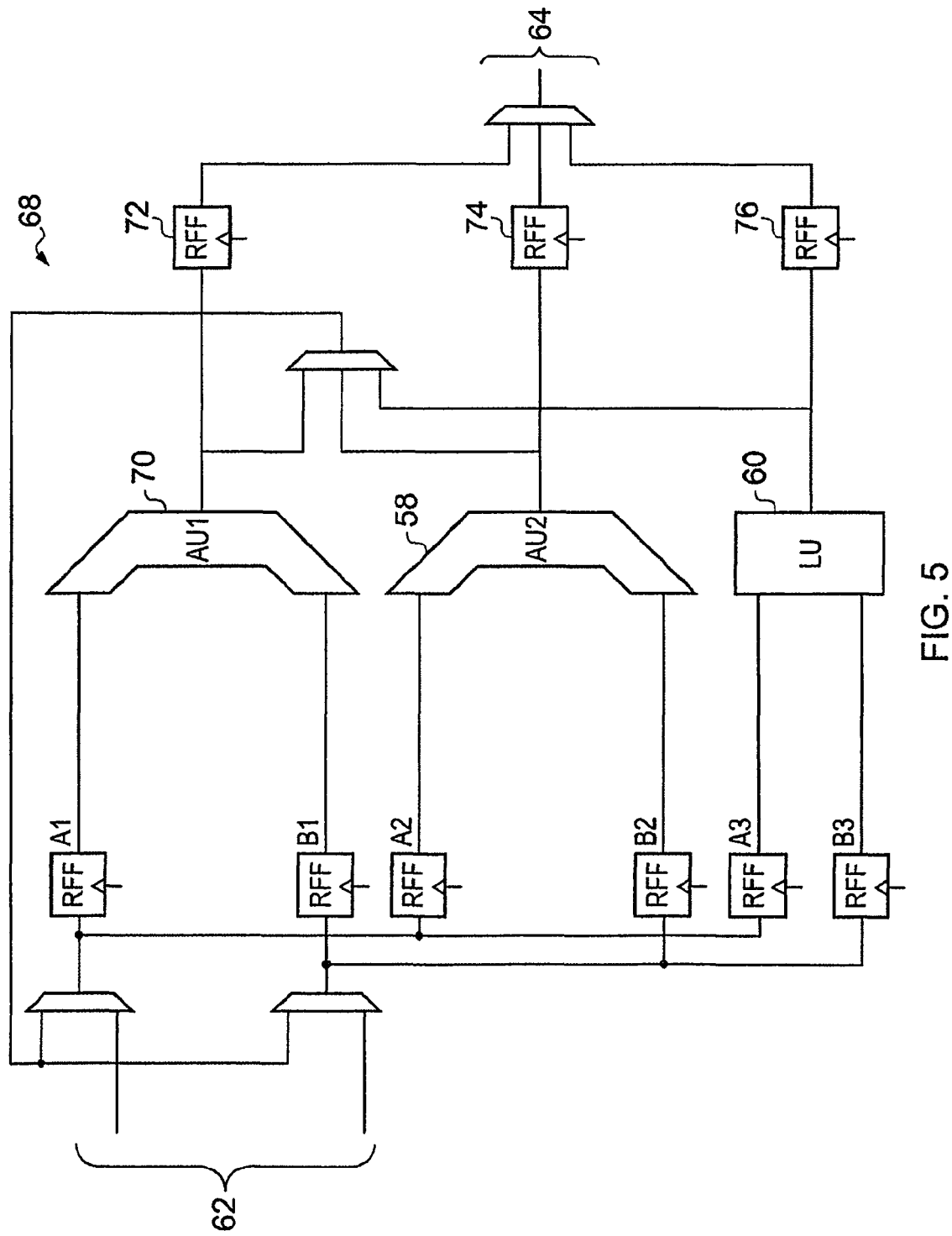
FIG. 5 schematically illustrates a group of execution units forming an arithmetic logic unit and including two arithmetic units as well as separate output latches for each execution unit.

FIG. 5 schematically illustrates a group of execution units 68 in which compared to FIG. 4 there has been added an additional arithmetic unit 70 and separate output latches 72, 74, 76 in respect of each of the execution units 58, 60, 70. These modifications are such that even if a short path error potential may arise due to a short path through the arithmetic units 58, 70, program instructions may be issued on alternate processing cycles to these arithmetic units 58, 70 and be captured in their respective output latches 74, 72 in a manner such that the error detecting circuitry 32 associated with the respective output latches 72, 74 will not produce a false positive short path error detection.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data in response to a stream of program instructions, said apparatus comprising:
a plurality of execution units responsive to said stream of program instructions to perform data processing operations specified by said stream of program instructions; and
dynamic scheduling circuitry, responsive to a current state of said plurality of execution units, configured to issue, for execution during one or more processing clock cycles, program instructions of said stream of program instructions to respective execution units of said plurality of execution units; wherein
at least one of said execution units is an error-detecting execution unit comprising a latch responsive to a signal generated by said error-detecting execution unit to capture at a capture time a data value and error detecting circuitry responsive to a change in said signal during an error detecting period following said capture time to trigger an error recovery response; and
said scheduling circuitry suppresses issue of program instructions to said error-detecting execution unit in a current processing clock cycle where a program instruction was issued to said error-detecting execution unit in a processing clock cycle immediately preceding said current processing clock cycle.

2. Apparatus as claimed in claim 1, wherein said dynamic scheduling circuitry is responsive to said current state of said plurality of execution units to vary at least one of:
an order of issue of said program instructions;
a number of program instructions issued in a processing cycle; and
a time of issuing a program instruction.

3. Apparatus as claimed in claim 1, wherein said plurality of execution units are part of a superscalar processor.

4. Apparatus as claimed in claim 1, wherein a group of a plurality of execution units share at least one of a common operand input path and a common operand output path and said scheduling circuitry permits issue of program instructions on consecutive processing clock cycles to different execution units within said group.

5. Apparatus as claimed in claim 4, wherein said group comprises a plurality of execution units having common functionality and said scheduling circuitry issues consecutive program instruction requiring said common functionality to different execution units within said group.

6. Apparatus as claimed in claim 1, wherein said plurality of execution units are arranged to form a plurality of execution clusters for respective different types of program instruction and said scheduling circuitry operates to maintain an instruction queue for each respective execution cluster.

7. Apparatus as claimed in claim 6, wherein said plurality of execution cluster comprise one or more of:
a simple execution cluster;
a branch execution cluster;
a complex execution cluster; and
a load/store execution cluster.

8. Apparatus as claimed in claim 6, wherein each execution cluster comprises one or more execution pipelines.

9. Apparatus for processing data in response to a stream of program instructions, said apparatus comprising:
a plurality of execution means for performing data processing operations specified by said stream of program instructions; and
dynamic scheduling means, responsive to a current state of said plurality of execution means, for issuing, for execution during one or more processing clock cycles, program instructions of said stream of program instructions to respective execution means of said plurality of execution means; wherein
at least one of said execution means is an error detecting execution unit comprising latch means for capturing at a capture time a data value from a signal generated by said error-detecting execution unit and error detecting means for triggering an error recovery response upon detection of a change in said signal during an error detecting period following said capture time ; and
said scheduling means suppresses issue of program instructions to said error-detecting execution unit in a current processing clock cycle where a program instruction was issued to said error-detecting execution unit in a processing clock cycle immediately preceding said current processing clock cycle.

10. A method of processing data in response to a stream of program instructions, said method comprising the steps of:
performing data processing operations, in response to and specified by said stream of program instructions and using a plurality of execution units, at least one of said execution units being an error-detecting execution unit using a latch responsive to a signal generated by said error-detecting execution unit to capture at a capture time a data value and error detecting circuitry responsive to a change in said signal during an error detecting period following said capture time to trigger an error recovery response;
issuing, as part of dynamic scheduling and responsive to a current state of said plurality of execution units, for execution, during one or more processing clock cycles, program instructions of said stream of program instructions to respective execution units of said plurality of execution units; and
suppressing issue of program instructions to said error-detecting execution unit in a current processing clock cycle where a program instruction was issued to said error-detecting execution unit in a processing clock cycle immediately preceding said current processing clock cycle.

11. A method as claimed in claim 10, wherein said dynamic scheduling is responsive to a current state of said plurality of execution units to vary at least one of:
an order of issue of said program instructions;
a number of program instructions issued in a processing cycle; and
a time of issuing a program instruction.

12. A method as claimed in claim 10, wherein said plurality of execution units are part of a superscalar processor.

13. A method as claimed in claim 10, wherein a group of a plurality of execution units share at least one of a common operand input path and a common operand output path and said step of issuing permits issue of program instructions on consecutive processing clock cycles to different execution units within said group.

14. A method as claimed in claim 13, wherein said group comprises a plurality of execution units having common functionality and said scheduling circuitry issues consecutive program instruction requiring said common functionality to different execution units within said group.

15. A method as claimed in claim 10, wherein said plurality of execution units are arranged to form a plurality of execution clusters for respective different types of program instruction and said scheduling circuitry operates to maintain an instruction queue for each respective execution cluster.

16. A method as claimed in claim 15, wherein said plurality of execution cluster comprise one or more of:

a simple execution cluster;
a branch execution cluster;
a complex execution cluster; and
a load/store execution cluster.

17. A method as claimed in claim 15, wherein each execution cluster comprises one or more execution pipelines.

\* \* \* \* \*